United States Patent Office 3,387,695
Patented June 11, 1968

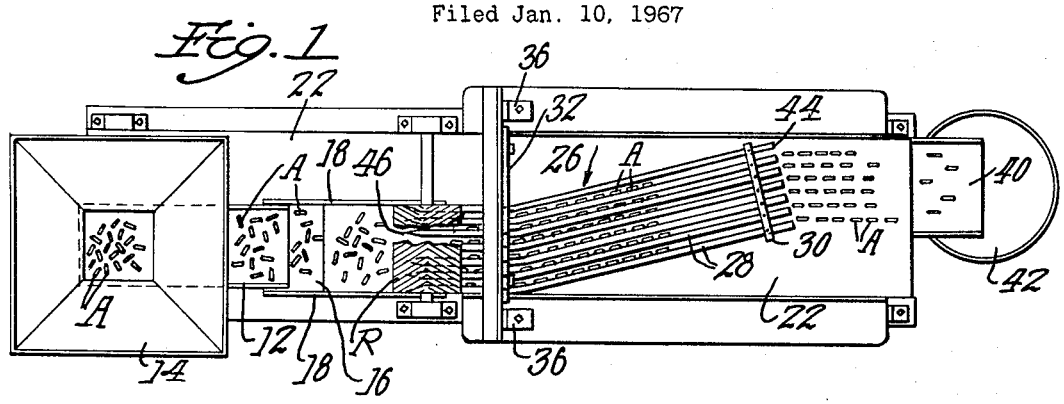
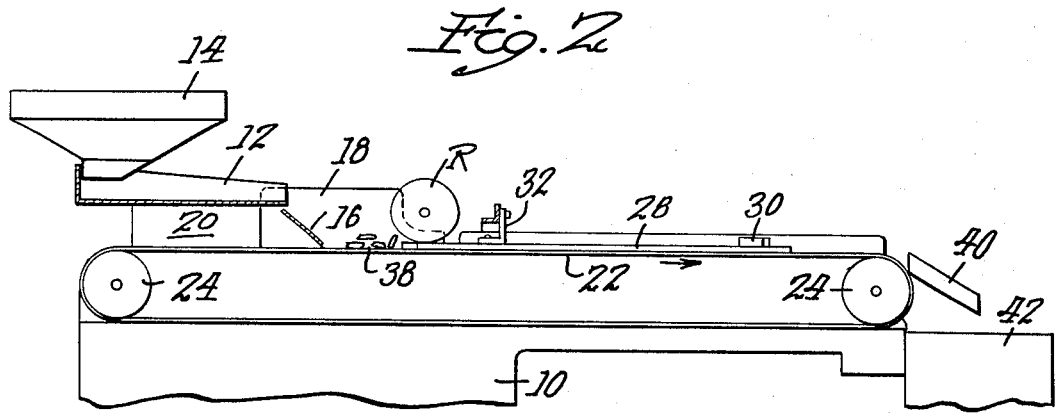
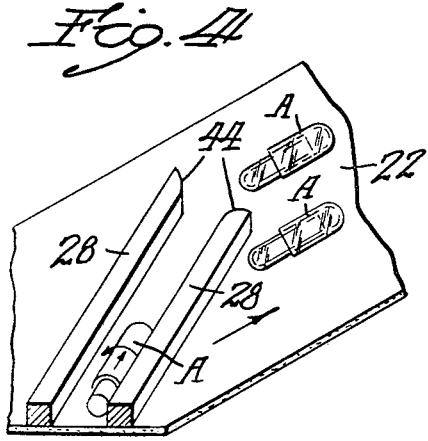
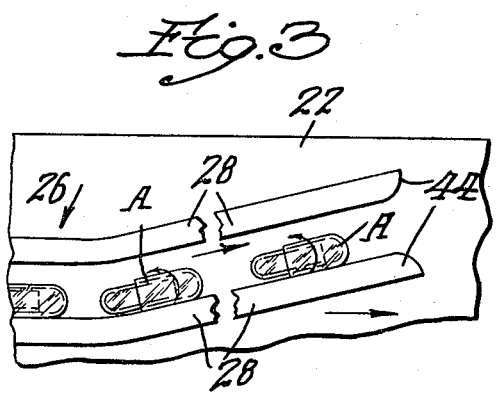
Inventor
Ralph Hendrickson
By Charles R. Fay,
Attorney

3,387,695
INSPECTION OF MOVING DISCRETE PARTICLES
Ralph Hendrickson, Gardner, Mass., assignor to The Lakso Company Incorporated, Fitchburg, Mass., a corporation of Massachusetts
Filed Jan. 10, 1967, Ser. No. 608,452
1 Claim. (Cl. 198—33)

ABSTRACT OF THE DISCLOSURE

An inspection apparatus or table for discrete articles such as capsules which have generally circular sections but are elongated, the inspection apparatus comprising a conveyor belt which is used to move the articles in one direction, together with a series of parallel bars or the like spaced apart sufficiently to accept the articles so that the belt will travel the articles between the bars, the bars being close enough to carry the articles in an oriented direction, i.e., in a direction according to their longitudinal axes, the bars having portions thereof at an incline with respect to the articles about their longitudinal axes due to the frictional impact of the articles on the bars because of the relative inclination of the bars and belt travel.

---

Many small manufactured articles must be thoroughly inspected, particularly in the pharmaceutical field. Whereas flat disc-shaped articles are easily inspected on both sides simply by turning them over, it has been a very difficult operation to thoroughly inspect objects which have generally circular sections such as capsules of varying forms, such as ovate, cylindrical, etc.

The principal object of this invention is to provide a relatively simple apparatus for automatically turning such articles in such a way as to pass, within a short distance, past an observer or inspector who is therefore able to quickly and easily spot imperfections, breaks, etc., because the entire surface of such an article is observed. This is accomplished by providing a conveyor moving in a predetermined direction carrying the articles past the observer together with means acting in conjunction with the conveyor to cause the articles to rotate in a predetermined condition of alignment thereof, said means taking the form, e.g., of an inclined barrier, that is a barrier extending across the conveyor at an angle with respect thereto. This barrier fails to stop the forward progress of the articles but deflects them and due to the frictional impact of the articles on the inclined barrier, rotates them about their axes so that all surfaces thereof are presented to the view of the inspector within a very short distance along the conveyor.

Other objects and advantages of the invention will appear hereinafter.

Reference is to be had to the accompanying drawings in which:

FIG. 1 is a top plan view of the inspection apparatus comprising the present invention;

FIG. 2 is a view in side elevation thereof with parts removed;

FIG. 3 is a diagrammatic view on an enlarged scale, and

FIG. 4 is a perspective view illustrating the action of the inclined barrier on the articles.

In illustrating a form of the invention, there may be provided any kind of framework such as at 10 with a vibrating article and traveling device thereon generally indicated at 12. This device comprises an elongated plate which may have a hopper 14 at one end and a chute 16 at the other end. Side walls at 18 may be utilized if desired and a conventional vibrating mechanism which may be actuated electrically is generally indicated at 20. This type of vibrator is old and well known and forms no part of the present invention except that by the vibration thereof, it causes the discrete articles A to progress to the right and down the chute onto the traveling belt 22.

This belt 22 may be mounted on a pair of rollers 24, 24 mounted in turn in any convenient manner on a frame 10. It is provided with a motor (not shown) for driving it in the direction of the arrows.

Mounted above the upper run of the belt 22 and in closely associated relation with respect thereto there is a grid generally indicated at 26. This grid comprises a plurality of parallel bars 28 held together in a predetermined spaced-apart relationship as for instance by a pair of cross bars 30 and 32. The bar 32 is mounted at its ends 34 as for instance on side plates 36 on the frame.

It will be seen from FIG. 2 that the bars 28 are spaced apart a sufficient distance for the articles A to rest on and to be moved by belt 22 from left to right, i.e., from the chute 16 as at 38 to the end chute 40, into a container 42. These bars are placed at an angle to the direction of motion of the upper run of belt 22. This angle is not critical and is determined mainly by the requirement that the articles shall be turned over, i.e., rotated, a complete rotation and preferably a little more, before moving off of the end of the grid which is indicated at 44.

The bar 32 may be mounted in any way, i.e., its relationship with respect to the direction of motion of the belt is per se not important, but it is conveniently mounted at a right angle as clearly shown in the drawings.

The vibrator 12 is preferably mounted adjacent one side edge of the belt as shown in FIG. 1 so that the terminal end 44 of the grid 26 will correspond with the belt so that all of the articles issuing from the end of the grid will remain on the belt. Also the entrance end of the grid at 46 preferably has the bars curved so that they are parallel with the direction of motion of articles A. Because of this the articles enter between bars and follow the course of the grid easily without jamming.

In FIGS. 3 and 4 there has been shown why the articles A rotate. As they are moved to the right on belt 22, each article impinges upon a bar 28 at what may be termed the downstream side of the article. This causes a small amount of friction between the article A and the bar so that the articles tend to be slowed, and a rotary component of force is created here, the belt therefore tending to rotate the articles A on their axes against the respective bar. This effect is increased the greater the angle between the bars and the direction of motion of the belt.

This angle may be varied considerably depending upon the nature of the surface of the articles. If they are gelatin capsules of course they do not have a very highly frictional surface but on the other hand it has been found that an angle of about seventeen or eighteen degrees is sufficient for turning such gelatin capsules say one-and-a-half times in a distance of a little over a foot. This also depends somewhat on the speed of the belt which cannot be too great or otherwise the articles might fail to flow smoothly along the grid between the bars.

Now looking at FIG. 3 with the belt moving in the direction of the arrow and attempting to move the articles A in the same direction but being interdicted to a small degree at least, by reason of the presence of the bars, the belt tends to slip relative to the articles A and the speed of the articles is therefore somewhat less than that of the belt. This then results in a rolling action of the articles on their axes and between the bars 28 but they are still moving in the direction of the arrows at an angle with respect to the belt until they issue from the end of the grid 26 at 44.

Therefore it will be seen that an inspector will view all sides of all of the articles as they pass along the inclined portion of the grid 26 as clearly shown in FIG. 1, and any defective, broken, partly-filled or empty capsules are easily abstracted by any means such as for instance tweezers or suction devices, etc.

In this application, a spiral rib rubber covered roll R can be used, this type of roll aiding in aligning the articles in a single layer to improve their facility of entrance into the grid, and the bars at 46 may be pointed and beveled to aid this action.

Having thus described my invention and the advantages thereof, I do not wish to be limited to the details herein disclosed, otherwise than as set forth in the claim, but what I claim is:

1. An inspection apparatus for discrete elongated articles having generally circular sections, comprising a conveyor upon which said articles are traveled, means orienting said articles with their long axes parallel to the direction of travel of the conveyor, and means associated with said conveyor for rolling said articles on their circular sections as the articles are progressed under influence of said conveyor, said means comprising a grid including a series of parallel bars spaced apart greater than the widths of the articles and accepting said articles between bars, said bars being in close association with respect to said conveyor, said bars being located at an angle with respect to the direction of motion of said conveyor, so that the articles travel in the direction of their long axes but at an incline relative to the direction of travel of the belt while between the bars, and by frictional contact of the articles relative to the bars the articles are rotated at least one complete turn, the belt extending beyond the ends of the bars in the direction of travel of the belt, and means receiving the articles from the belt.

References Cited
UNITED STATES PATENTS 3,180,476 4/1965 Marasso _____ 198—33
3,240,314 3/1966 Griner _____ 198—30

RICHARD E. AEGERTER, *Primary Examiner.*